(12) United States Patent
Gallagher et al.

(10) Patent No.: US 10,263,719 B2
(45) Date of Patent: *Apr. 16, 2019

(54) METHOD AND SYSTEM FOR INTERFERENCE AVOIDANCE IN A MULTI-PROTOCOL COMMUNICATION SYSTEM

(71) Applicant: Maxlinear, Inc., Carlsbad, CA (US)

(72) Inventors: Timothy Gallagher, Carlsbad, CA (US); Madhukar Reddy, Carlsbad, CA (US)

(73) Assignee: Maxlinear, Inc., Carlsbad, CA (US)

(*) Notice: Subject to any disclaimer, the term of this patent is extended or adjusted under 35 U.S.C. 154(b) by 109 days.

This patent is subject to a terminal disclaimer.

(21) Appl. No.: 14/944,573

(22) Filed: Nov. 18, 2015

(65) Prior Publication Data

US 2016/0072600 A1    Mar. 10, 2016

Related U.S. Application Data

(63) Continuation of application No. 13/305,918, filed on Nov. 29, 2011, now Pat. No. 9,204,087.

(51) Int. Cl.
*H04L 1/12* (2006.01)
*H04J 1/12* (2006.01)
*H04L 5/00* (2006.01)
*H04N 7/10* (2006.01)
(Continued)

(52) U.S. Cl.
CPC .............. *H04J 1/12* (2013.01); *H04B 3/32* (2013.01); *H04L 5/0005* (2013.01); *H04L 5/0062* (2013.01); *H04N 7/106* (2013.01); *H04N 21/6118* (2013.01); *H04L 5/0046* (2013.01); *H04N 21/6168* (2013.01)

(58) Field of Classification Search
CPC ..... H04L 5/0046; H04L 5/005; H04L 5/0062; H04N 7/106; H04N 21/6118; H04N 21/6168; H04J 1/12
See application file for complete search history.

(56) References Cited

U.S. PATENT DOCUMENTS

2011/0128175 A1* 6/2011 Harris ................. H03M 1/0836
341/155
2011/0258678 A1* 10/2011 Cowling ............... H04W 16/16
725/125

* cited by examiner

*Primary Examiner* — Pao Sinkantarakorn
(74) *Attorney, Agent, or Firm* — McAndrews, Held & Malloy

(57) ABSTRACT

Methods and systems for interference avoidance in a multi-protocol communication system may comprise receiving signals in a first communications protocol in a first frequency range and preventing interference signals from being generated in said first frequency range by configuring channel usage in a second communications protocol in a second frequency range based on said received signals. The configuring channel usage may include avoiding communicating in taboo channels and the received signals in said first communications protocol and signals in said configured channels in said second communications protocol may be communicated over one or more coaxial cables based on the configured channel usage. The taboo channels may be selected based on said received signals such that interference signals from said second frequency range do not occur in said first frequency range. The first frequency range comprises a cable or satellite television frequency range, or data over cable service interface standard (DOCSIS).

20 Claims, 5 Drawing Sheets

(51) Int. Cl.
*H04N 21/61* (2011.01)
*H04B 3/32* (2006.01)

METHOD AND SYSTEM FOR INTERFERENCE AVOIDANCE IN A MULTI-PROTOCOL COMMUNICATION SYSTEM

This application is a continuation of application Ser. No. 13/305,918 filed on Nov. 29, 2011, which is hereby incorporated herein by reference in its entirety.

FIELD OF THE INVENTION

Certain embodiments of the invention relate to multimedia communication. More specifically, certain embodiments of the invention relate to a method and system for interference avoidance in a multi-protocol communication system.

BACKGROUND OF THE INVENTION

In digital sampling, the Nyquist frequency is one half the sampling frequency, and is also called the folding frequency. As a result of sampling, a signal that is higher in frequency than the Nyquist frequency will "fold" to a frequency below the Nyquist frequency by the same amount that the signal is above the Nyquist frequency. Although this folding frequency signal may be mitigated with filters before the sampler, such filters adversely affect the system cost and power consumption.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for interference avoidance in a multi-protocol communication system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for interference avoidance in a multi-protocol communication system. Exemplary aspects of the invention may comprise receiving signals in a first communications protocol in a first frequency range, configuring channel usage in a second communications protocol in a second frequency range based on the received signals to control interference due to aliasing from or harmonics of the second frequency range to the first frequency range. The received signals in the first communications protocol and signals in the configured channels in the second communications protocol may be communicated over one or more coaxial cables based on the configured channel usage. The configuring may comprise configuring channel usage in the second communications protocol in the second frequency range based on the received signals such that signals aliased from the second frequency range to the first frequency range do not degrade performance of the first communications protocol below a threshold performance level. The first frequency range may comprise a cable or satellite television frequency range. The first communications protocol may comprise data over cable service interface standard (DOCSIS). The second communications protocol may comprise multimedia over coaxial alliance (MoCA) standard. The configuring channel usage in the second communication protocol may comprise varying bit loading, power levels, or degree of modulation of signals transmitted over the second communications protocol. The modulation of signals may comprise orthogonal frequency division multiple access (OFDMA) modulation.

Figure 1:
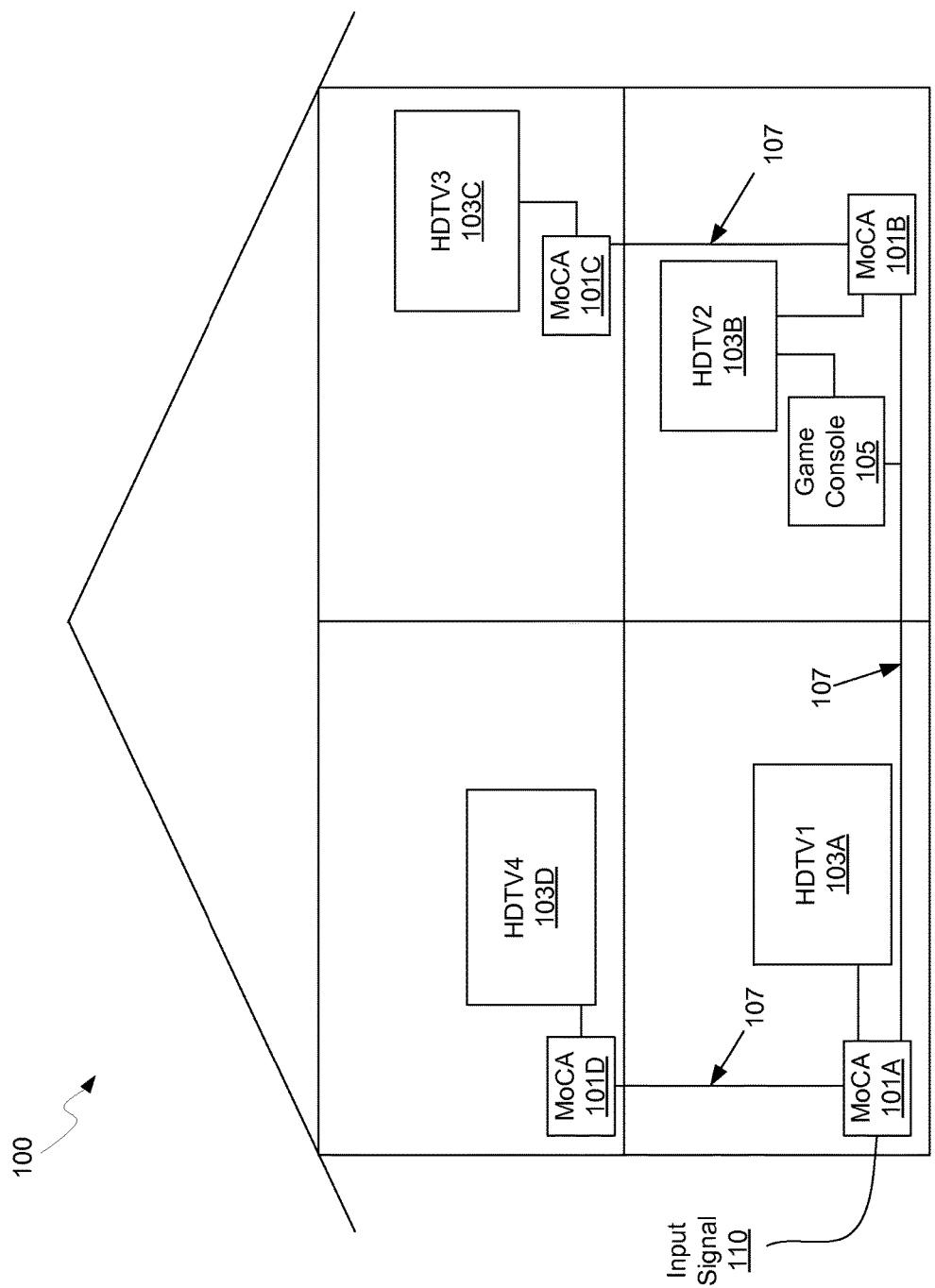
FIG. 1 is a diagram illustrating an exemplary wired network in a dwelling, in accordance with an embodiment of the invention

FIG. 1 is a diagram illustrating an exemplary wired network in a dwelling, in accordance with an embodiment of the invention. Referring to FIG. 1, there is shown a dwelling 100 comprising a plurality of rooms, each which may have one or more networked devices, such as Multimedia over Cable Alliance (MoCA) bridges 101A-101D, high-definition televisions (HDTVs) 103A-103D, and a game console 105. There is also shown coaxial cables 107, and an input signal 110, which may be provided by a cable head-end or a satellite signal source, for example.

The MoCA bridges 101A-101D (or general MoCA devices) may comprise network bridges that enable a secure wired network utilizing the coaxial cables 107 in the dwelling 100. The MoCA bridges 101A-101D may operate under the MoCA 1.x or 2.x specification, for example, and may communicate signals between bridges in a 1-2 GHz frequency range. Other communication protocols may be utilized on the same coaxial cables 107 leading to possible interference. For example, data over cable service interface standard (DOCSIS) signals may be communicated over the coaxial lines 107 for providing general data communication over the television cable infrastructure. One or more of the MoCA bridges 101A-101D may comprise a network controller in the wired network, coordinating the wired network communications as per the MoCA standard. For example, a first of the MoCA bridges 101A-101D may operate as the MoCA network controller (NC), while a second operates as a back-up NC.

Cable television signals, including DOCSIS signals, may be communicated in the 50 MHz to 1 GHz range. Traditional receivers typically used a heterodyne architecture to select one or a few channels out of the entire cable spectrum (each channel being 6 or 8 MHz). However, it may be advantageous to utilize an architecture that digitizes the entire cable spectrum rather than a few channels. This allows any combination of channels to be processed digitally. Thus, MoCA signals in the 2 GHz range may (depending on the sampling rate) fold down to (or alias into) the 700 MHz range, possibly interfering with the cable signals. The cable range generally has about 150 6-MHz TV channels, some of which are allocated to DOCSIS, some to digital television, and some to analog television. DOCSIS may, for example, be used to provide Internet access to the cable subscriber.

MoCA may, for example, operate up to 2150 MHz in the future, and potentially beyond. However, depending on the sampling rate of the DOCSIS/cable television receiver, such higher frequency components will fold down into the cable/DOCSIS frequency spectrum and cause aliasing. As an example, operating with a sampling rate of 2.7 GHz and a corresponding Nyquist frequency of 1.35 GHz, MoCA signal energy near 2 GHz will cause aliasing issues well below 1 GHz and into the cable/DOCSIS frequency spectrum In conventional MoCA systems, the frequencies may be limited by design to a top end of 1.55 GHz, which is why a 2.7 GHz sampling rate for the cable/DOCSIS system is sometimes selected. For example, a 1.35 GHz Nyquist frequency is in the middle of the 1.15-1.55 GHz range, and thus if there is no energy above 1.55 GHz, no aliasing effects will be seen in the cable/DOCSIS spectrum. However, since MoCA can utilize frequency spectrum much higher than 1.55 GHz (e.g., to at least 2.15 GHz in future implementations), substantial amounts of communication bandwidth are wasted by such a brute-forced solution.

To mitigate the interference between communications protocols, such as between MoCA and DOCSIS, various aspects of the present invention may comprise utilizing knowledge of the frequency utilization in the MoCA and DOCSIS spectra to minimize MoCA/DOCSIS interference (e.g., by adjusting MoCA frequency utilization to reduce alias effects in the DOCSIS frequency space).

In an embodiment of the invention, the MoCA bridges 101A-101D (or other MoCA devices) may be capable of communicating over both DOCSIS and MoCA protocols, thereby having knowledge of the channels being used in both protocols. In an exemplary embodiment, one of the MoCA bridges 101A-101D (e.g., a MoCA network controller) may determine that it is utilizing a cable-DOCSIS frequency range (e.g., one near the upper end of the cable space), identify the MoCA channel(s) and/or subcarrier(s) that, if utilized, will fold into the particular cable/DOCSIS frequency range and avoid the use of such identified MoCA channel(s) and/or subcarrier(s).

Various techniques may be utilized to perform such channel and/or subcarrier avoidance. For example, the identified channel(s) (or, e.g., 25MHz frequency bands) may be flagged as "TABOO" channels so that no members of the MoCA network transmit on such identified channel(s). A MoCA network controller (NC) may, for example, indicate such identified channel(s) as TABOO channel(s) in the MoCA beacon. As such, the MoCA network devices will avoid the use of such TABOO channel(s).

Also for example, the identified subcarrier(s) may be bit-loaded with zero bits (or nulled) so that no information will be modulated on such identified subcarrier(s),effectively reducing their transmission energy to zero. For example, in an exemplary scenario utilizing a 200 KHz sub-carrier spacing, one or more of such sub-carriers may be nulled to create an adjustable-sized notch of N×200 KHz in the MoCA frequency spectrum (and thus eliminate or substantially reduce aliasing effects in the corresponding DOCSIS frequency space).

In another exemplary embodiment, instead of refraining from any utilization of the identified channel(s) and/or subcarrier(s), the system may utilize such identified channel(s) and/or subcarrier(s) relatively lightly (e.g., relatively lighter than such subcarrier(s) would be utilized when considering operation of only this network). For example, the system may utilize a relatively small bit-load for each of the one or more identified sub-carriers. Such relatively small bit-load for the sub-carrier(s) will result in a corresponding reduction of transmission power at each of such sub-carriers, thus reducing the effects of aliasing in the corresponding DOCSIS frequency space. As a non-limiting example, in a system that provides for a sub-carrier to be bit-loaded by up to 10 bits (e.g., for utilization of up to 1024-QAM modulation), the system may determine to utilize only 2 or 4bits (e.g., for utilization of BPSK or QPSK modulation), and then utilize the relative robustness of the BPSK or QPSK modulations to achieve a relatively low transmission power.

In an exemplary scenario, the MoCA bridges 101A-101D may first bit-load identified MoCA subcarrier(s) at zero bits to zero the respective transmission energy of the identified MoCA subcarrier(s), and then gradually increase the bit-load, and/or the transmission energy, while monitoring the effects (e.g. the aliasing effects) on the cable/DOCSIS channel. The system may then cease increasing the bit-loading when the effects on the cable/DOCSIS channel reach a particular level. It should be noted that the MoCA bridges 101A-101D may comprise bridges for other communications protocols, but are described as MoCA bridges in this exemplary scenario.

In another exemplary scenario, there may typically be up to 8 or 16 TV channels to support the television and/or data coming in on the network medium (e.g., on the coaxial cable). Since the MoCA bridges 101A-101D know that such channels are susceptible to certain MoCA frequencies, MoCA taboo channels may be defined, which tells MoCA network devices to refrain from using particular MoCA channels. Also for example, the MoCA channels which affect relatively weak DOCSIS or video channels may be marked as taboo, while the MoCA channels which affect relatively strong DOCSIS or video channels may be free to use.

In yet another exemplary scenario, the MoCA bridges 101A-101D may configure the bit loading on a possible interfering channel such that the folded signal does not degrade the signal quality of the interfered channel. This is possible since the MoCA bridges 101A-101D communicate via and are aware of both communications protocols. The MoCA bridges 101A-101D may initially bit-load zero bits in subcarriers that interfere with the DOCSIS/video channel. Then such bridges may adaptively increase the bit-loading until the DOCSIS/video channel bit error rate (or S/N rate, or some other channel measure) approaches a predetermined limit. It should be noted that while only a zero-bit state results in lower power utilization in strict MoCA-compliant transmitters, bit loading may be reduced in transmitters making them MoCA compatible while perhaps not strictly compliant.

Note that the identification of channels in use by the communications protocols, and the adaptive utilization of communication channels to mitigate interference, may be a dynamic process such that the configuration of taboo channels and/or bit loading may be dynamically configured. For example, as different cable/DOCSIS channels are used, the utilization of the potentially interfering MoCA channels and/or sub-carriers may be adjusted. Such adjustment may, for example, be performed periodically (e.g., by scheduled periodic test) or may be performed upon detection of an event (e.g., detection of a change in spectral content in the cable/DOCSIS spectrum, detection of a user command that will result in a change in cable/DOCSIS utilization, etc.).

As mentioned above, though most of the channels in the cable/DOCSIS signal may be strong with plenty of margin, a few channels may be relatively weak. Thus, another aspect of the invention may include the identification of relatively weak channels. In such a scenario, MoCA channels (or sub-carriers) that are likely to alias into the relatively weak cable/DOCSIS channels may first be avoided entirely, and then if need be (e.g., if the demands of the MoCA network warrant it), such channels (or sub-carriers) be used lightly, such as by controlling the bit-loading of sub-carriers. Accordingly, adaptive bit-loading may be utilized to notch out small portions of the frequency spectrum (e.g., one or more 200 KHz portions, for example mapping to a 6 MHz cable channel) instead of whole 25 MHz, 50 MHz, and/or 100 MHz portions. Blanking out a few sub-carriers may be relatively transparent to performance of the MoCA network while having a meaningful interference-mitigation impact on DOCSIS operation.

In yet another exemplary scenario, a sub-carrier may be bit-loaded from 0 to 10 bits (0 bits for no energy to 10 bits for 1024 QAM), while a group of sub-carriers (e.g., adjacent sub-carriers) may be similarly bit-loaded (or alternatively differently bit-loaded, depending on the anticipated interference profile). In instances where a DOCSIS network is utilizing its mechanism to avoid bad channels according to the DOCSIS specification, the MoCA subcarrier utilization (e.g., the bit-loading) may be adjusted to degrade the DOCSIS channel to just less than the point at which DOCSIS cancels using the channel. For example, the DOCSIS channel may be pushed to its bit error rate (BER) threshold, so that both the MoCA channel and the DOCSIS channel may be utilized. As noted above, while only a zero-bit state results in lower power utilization in strict MoCA-compliant transmitters, bit loading may be reduced in transmitters making them MoCA compatible while perhaps not strictly compliant.

While FIG. 1 shows MoCA and cable/DOCSIS communications protocols, any network protocol may be applicable, where the network bridge has the capability to communicate via and/or knowledge of two or more communications protocols. The integration of two or more protocols in the network device and knowledge of channel usage assists with efficient use of shared frequency spectrum.

Figure 2:
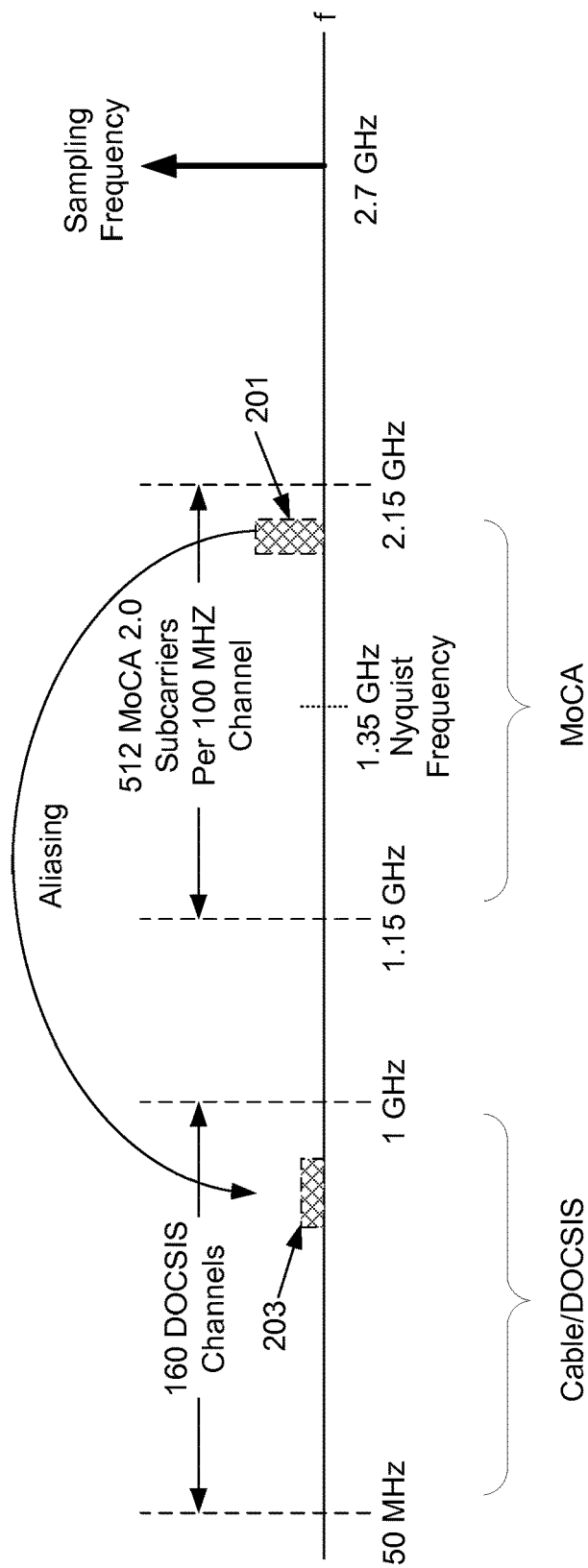
FIG. 2 is a diagram illustrating aliasing between different communications protocol frequency ranges, in accordance with an embodiment of the invention.

FIG. 2 is a diagram illustrating aliasing between different communications protocol frequency ranges, in accordance with an embodiment of the invention. Referring to FIG. 2, there is shown a cable/DOCSIS frequency range from ~50 MHz to ~1 GHz, and a MoCA frequency range from ~1.15 GHz to ~2.15 GHz. There is also shown a MoCA channel 201, a folded signal 203, a sampling frequency of 2.7 GHz, and a corresponding Nyquist frequency of 1.35 GHz.

In instances where a MoCA channel is being used in the 2 GHz range, such as the MoCA channel 201, the use of a 2.7 GHz sampling frequency results in a 1.35 GHz Nyquist frequency that may generate a folded interference signal at ~0.65 GHz, the folded signal 203, within the cable/DOCSIS frequency range. In an embodiment of the invention, the channels in use in the cable/DOCSIS frequency range may be known so that MoCA channels may be utilized even though signals will then be folded into the cable/DOCSIS spectrum. Such operation is assisted by the MoCA network device having knowledge of the cable/DOCSIS channel usage.

In an exemplary embodiment, the degree of modulation in the MoCA protocol channels may be adapted to limit the effects of aliasing to fall within the limits of the DOCSIS standard. For example, for a DOCSIS channel, a BER threshold (or other performance threshold) as defined by the DOCSIS standard may be reached by increasing the level of MoCA modulation (e.g., increasing sub-carrier bit-loading) and transmission power for relevant MoCA sub-carriers. Once the performance threshold is reached in the DOCSIS signal, the MoCA sub-carrier bit-loading (and thus transmission power) may then be reduced (e.g., by some comfort margin) to allow for utilization of the DOCSIS channel while also allowing for utilization of the MoCA sub-carrier(s). Such operation results in efficient utilization of both the MoCA and cable/DOCSIS spectral windows.

While FIG. 2 shows MoCA and cable/DOCSIS communications spectra, any network protocol may be applicable, where a network bridge and/or controller has the capability to communicate via and/or knowledge of two or more communications protocols. For example, satellite TV and MoCA may be supported by such a network controller and its nodes, where known satellite channel usage may be used to plan MoCA channel usage, and vice versa. In a satellite TV scenario, the MoCA signals may not alias into satellite channels, but MoCA harmonics may interfere with satellite channels. Therefore, the integration of two or more protocols in the network device and knowledge of channel usage assists with the use of more of the available spectrum and higher data throughput.

Figure 3A:
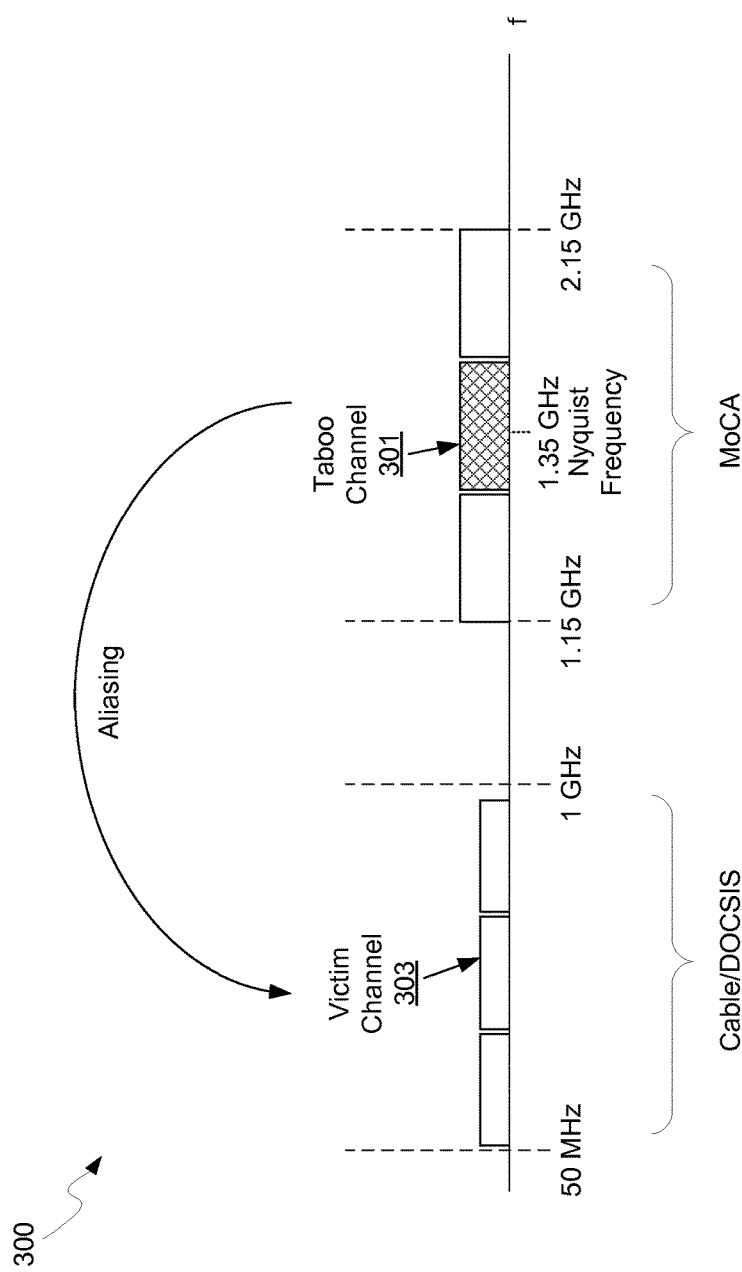
FIG. 3A is a diagram illustrating taboo channels for interference avoidance, in accordance with an embodiment of the invention.

FIG. 3A is a diagram illustrating use of taboo channels for interference avoidance, in accordance with an embodiment of the invention. Referring to FIG. 3A, there is shown exemplary cable/DOCSIS and MoCA channels 300. As described previously, aliased signals or harmonics may interfere with desired communications, degrading system performance. However, with knowledge of the channel usage in both communications channels, taboo channels may be utilized to mitigate aliasing and interference effects.

For example, the victim channel 303 may be interfered with in instances where signals are communicated in the frequency range bounded by the taboo channel 301. This interference may be mitigated by not communicating signals in the taboo channel 301 when it is known that signals are desired to be communicated in the victim channel 303 frequency range. In this manner, signals will not alias into the victim channel 303.

Similarly, in satellite TV and MoCA networks, harmonics of MoCA signals may interfere with desired satellite channels. In this instance, the channels that generate the interfering harmonics may be configured as taboo channels where signals are not communicated, mitigating the interference effects.

Figure 3B:
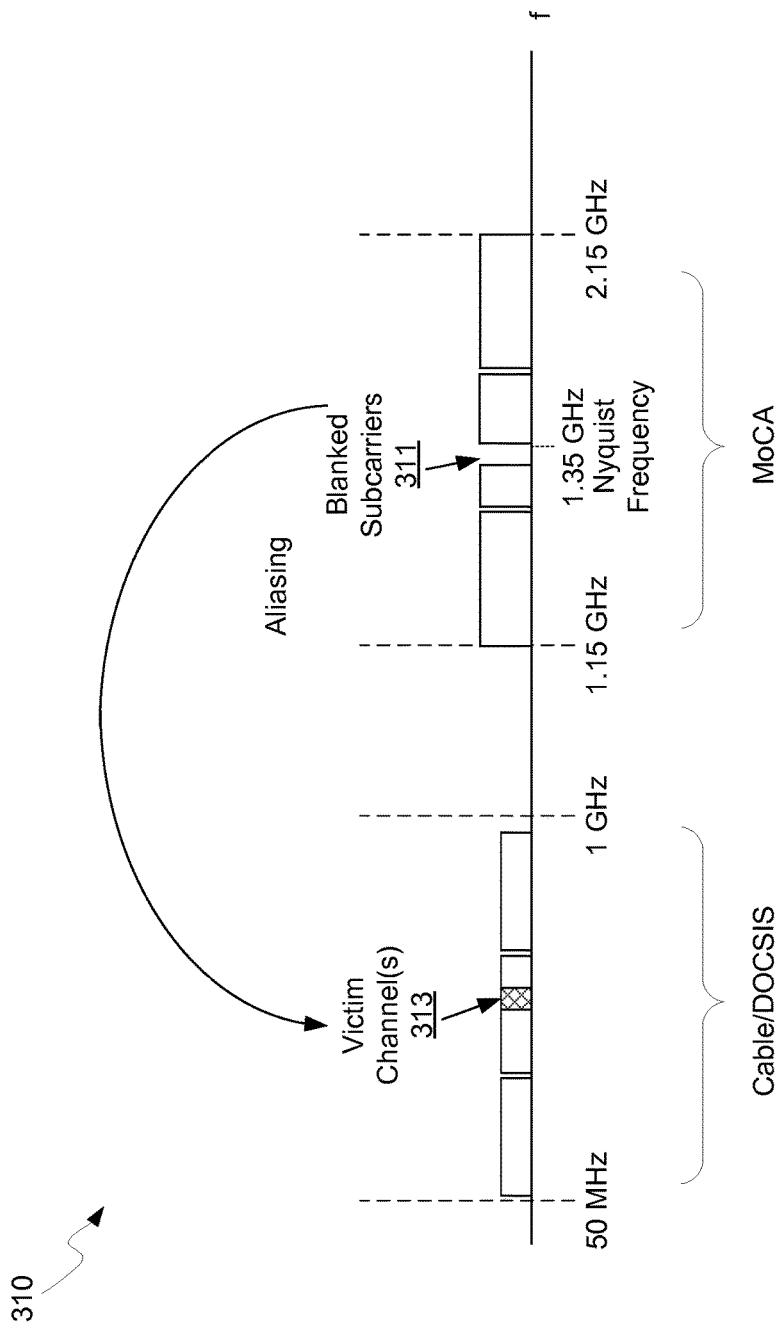
FIG. 3B is a diagram illustrating blanked subcarriers for interference avoidance, in accordance with an embodiment of the invention.

FIG. 3B is a diagram illustrating use of blanked subcarriers for interference avoidance, in accordance with an embodiment of the invention. Referring to FIG. 3B, there is shown exemplary cable/DOCSIS and MoCA channels 310. As described previously, aliased signals or harmonics may interfere with desired communications, degrading system performance. However, with knowledge of the channel usage in both communications channels, blanked subcarriers may be utilized to mitigate aliasing and interference effects.

For example, the victim channel(s) 313 may be interfered with in instances where signals are communicated in the frequency range bounded by the blanked subcarriers 311. Aliasing into the victim channel(s) 313 may thus be mitigated by not communicating signals in the blanked subcarriers 311 frequency range, if it is known that signals are desired to be communicated in the victim channel(s) 313 frequency range.

Figure 4:
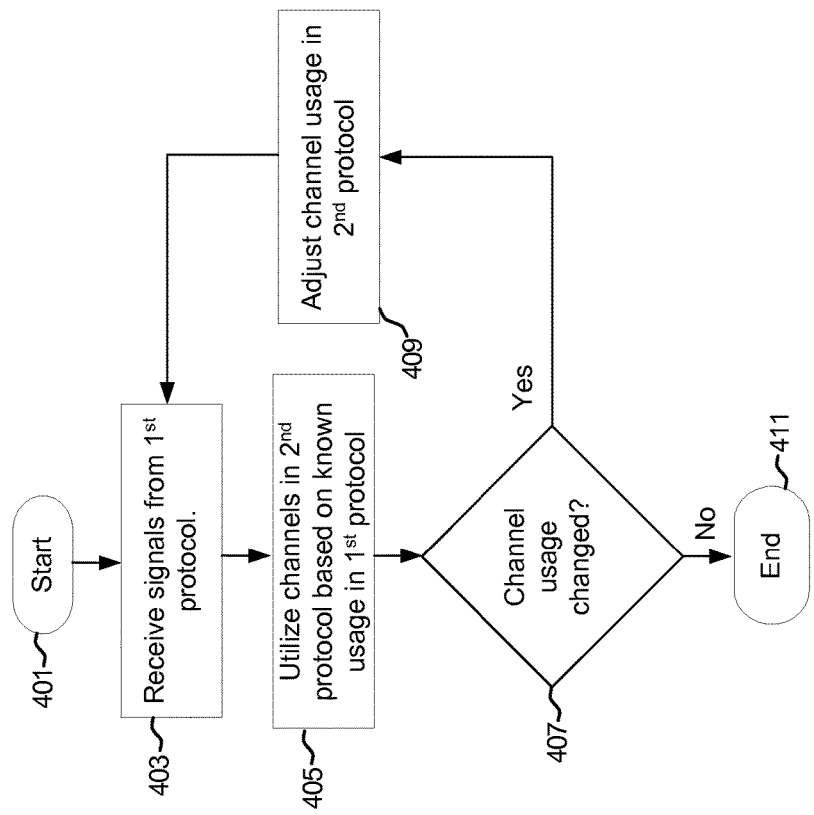
FIG. 4 is a block diagram illustrating exemplary steps in interference avoidance in a multi-protocol communication system, in accordance with an embodiment of the invention.

FIG. 4 is a block diagram illustrating exemplary steps in interference avoidance in a multi-protocol communication system, in accordance with an embodiment of the invention.

The exemplary method illustrated in FIG. 4 may, for example, share any or all functional aspects discussed previously with regard to FIGS. 1-3. Referring to FIG. 4, after start step 401, in step 403, a multi-protocol system may receive signals from a first protocol.

In step 405, the system may communicate signals in channels in the $2^{nd}$ protocol based on the known usage of the first protocol. Step 405 may, for example and without limitation, share any or all functional aspects discussed previously (e.g., with regard to modifying carrier and/or sub-carrier utilization in a second communication protocol to mitigate interference with a first communication protocol).

In step 407, the channels may be monitored in the first protocol, and if changed, the exemplary steps proceed to step 409, where the channel usage in the $2^{nd}$ protocol may be adjusted based on the changes usage in the $1^{st}$ protocol. If no change is detected, the process ends in end step 411 (or, for example, loops back to itself for continued monitoring).

In an embodiment of the invention, a method and system may comprise receiving signals in a first communications protocol in a first frequency range, configuring channel usage in a second communications protocol in a second frequency range based on the received signals to control aliasing from the second frequency range to the first frequency range. The received signals in the first communications protocol and signals in the configured channels in the second communications protocol may be communicated over one or more coaxial cables based on the configured channel usage.

The configuring may comprise configuring channel usage in the second communications protocol in the second frequency range based on the received signals such that interference signals aliased from, or harmonics of, the second frequency range to the first frequency range do not degrade performance of the first communications protocol below a threshold performance level. The first frequency range may comprise a cable or satellite television frequency range. The first communications protocol may comprise data over cable service interface standard (DOCSIS). The second communications protocol may comprise multimedia over coaxial alliance (MoCA) standard. The configuring channel usage in the second communication protocol may comprise varying bit loading, power levels, or degree of modulation of signals transmitted over the second communications protocol. The modulation of signals may comprise orthogonal frequency division multiple access (OFDMA) modulation.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for interference avoidance in a multi-protocol communication system.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for multimedia communication, the method comprising:
   in a multi-protocol communication system:
      receiving signals in a first communications protocol in a first frequency range;
      communicating signals in accordance with a second communications protocol at frequencies in a second frequency range with a reduced bit-load for carriers that alias into the first frequency range, such that said signals communicated at said frequencies in said second frequency range alias into frequencies of said received signals in said first frequency range with reduced power when said signals in said second frequency range are sampled; and
      communicating said received signals in said first communications protocol and signals in said second communications protocol over one or more coaxial cables.

2. The method according to claim 1, wherein frequencies of said signals communicated in said second frequency range are selected based on said received signals such that interference signals from said second frequency range do not occur in said first frequency range.

3. The method according to claim 1, wherein said first frequency range comprises a cable television frequency range.

4. The method according to claim 1, wherein said first frequency range comprises a satellite television frequency range.

5. The method according to claim 1, wherein said first communications protocol comprises data over cable service interface standard (DOCSIS).

6. The method according to claim 1, wherein said second communications protocol comprises multimedia over coaxial alliance (MoCA) standard.

7. The method according to claim 1, comprising varying bit-loading of signals transmitted over said second communications protocol.

8. The method according to claim 1, comprising varying power levels of signals transmitted over said second communications protocol.

9. The method according to claim 1, comprising varying a degree of modulation of signals transmitted over said second communications protocol.

10. The method according to claim 9, wherein said modulation of signals comprises orthogonal frequency division multiple access (OFDMA) modulation.

11. A system for multimedia communication, the system comprising:
one or more circuits for use in a multi-protocol communications device, said one or more circuits being operable to:
receive signals in a first communications protocol in a first frequency range;
communicating signals in accordance with a second communications protocol at frequencies in a second frequency range with a reduced bit-load for carriers that alias into the first frequency range, such that said signals communicated in said second frequency range alias into frequencies of said received signals in said first frequency range with reduced power when said signals in said second frequency range are sampled; and
communicate said received signals in said first communications protocol and signals in said second communications protocol over one or more coaxial cables.

12. The system according to claim 11, wherein said one or more circuits are operable to select frequencies of said signals communicated in said second frequency range based on said received signals such that interference signals from said second frequency range do not occur in said first frequency range.

13. The system according to claim 11, wherein said first frequency range comprises a cable television frequency range.

14. The system according to claim 11, wherein said first frequency range comprises a satellite television frequency range.

15. The system according to claim 11, wherein said first communications protocol comprises data over cable service interface standard (DOCSIS).

16. The system according to claim 11, wherein said second communications protocol comprises multimedia over coaxial alliance (MoCA) standard.

17. The system according to claim 11, wherein said one or more circuits are operable to vary bit-loading of signals transmitted over said second communications protocol.

18. The system according to claim 11, wherein said one or more circuits are operable to vary power levels of signals transmitted over said second communications protocol.

19. The system according to claim 11, wherein said one or more circuits are operable to vary a degree of modulation of signals transmitted over said second communications protocol.

20. A system for multimedia communication, the system comprising:
a multi-media over cable alliance (MoCA) network controller that is operable to receive cable or satellite television signals, and to communicate signals in accordance with said cable or satellite television signals with a reduced bit-load for carriers that alias into MoCA channels, such that said signals communicated in said second frequency range alias into said received signals in said first frequency range with reduced power when said signals in said second frequency range are sampled.

* * * * *